(12) United States Patent
Ko et al.

(10) Patent No.: US 10,311,066 B1
(45) Date of Patent: Jun. 4, 2019

(54) IDENTIFYING REASONS FOR WEB SITE ABANDONMENT

(71) Applicant: Answerdash Inc., Seattle, WA (US)

(72) Inventors: Andrew Ko, Seattle, WA (US); Andriy Bida, Bothell, WA (US)

(73) Assignee: Answerdash Inc., Seattle, WA (US)

( * ) Notice: Subject to any disclaimer, the term of this patent is extended or adjusted under 35 U.S.C. 154(b) by 640 days.

(21) Appl. No.: 15/042,060

(22) Filed: Feb. 11, 2016

Related U.S. Application Data (60) Provisional application No. 62/114,142, filed on Feb. 10, 2015.

(51) Int. Cl.
  *G06F 17/30* (2006.01)
  *G06F 16/2457* (2019.01)
  *G06F 17/22* (2006.01)
  *G06F 16/22* (2019.01)
  *G06F 16/9535* (2019.01)

(52) U.S. Cl.
  CPC ........ *G06F 16/24578* (2019.01); *G06F 16/22* (2019.01); *G06F 16/9535* (2019.01); *G06F 17/2247* (2013.01)

(58) Field of Classification Search
  CPC ...................................................... H05L 63/10
  USPC ........................................ 707/706, 707, 708
  See application file for complete search history.

(56) References Cited

U.S. PATENT DOCUMENTS

| | | | | |
|---|---|---|---|---|
| 9,432,361 | B2 * | 8/2016 | Mahaffey | H04L 63/0853 |
| 9,438,575 | B2 * | 9/2016 | Shi | H04L 63/18 |
| 10,050,952 | B2 * | 8/2018 | Shi | H04L 63/18 |
| 2013/0167208 | A1 * | 6/2013 | Shi | H04L 63/18 726/5 |
| 2014/0337863 | A1 * | 11/2014 | Rusu | G06Q 10/103 719/318 |
| 2016/0337863 | A1 * | 11/2016 | Robinson | H04W 12/08 |
| 2016/0373428 | A1 * | 12/2016 | Shi | H04L 63/18 |
| 2017/0272055 | A1 * | 9/2017 | Nakahori | H03H 7/0153 |

* cited by examiner

*Primary Examiner* — Baoquoc N To
(74) *Attorney, Agent, or Firm* — Rowan TELS LLC (57) ABSTRACT

A method of determining webpage abandonment configures webpages of a scoped domain to include at least one question and at least one associated answer displayable in response to receiving an explicit user interaction; implement tracking logic to generate a unique visitor ID, a unique webpage ID, and timestamp in response to detecting a webpage loading event on the scoped domain; generate a unique question/answer pair ID and timestamp in response to detecting an answer presentation event on the scoped domain; and operate a multiplexing switch to selectively transmit a webpage interaction entry and an answer presentation entry for storage in allocated of memory. The method filter for destination pages by the identified unique visitor IDs; configures a timer to filter for the associated destination pages for abandonment events based on the elapsed time; calculate a ranking metric to store question/answer pairs, and reposition stored question/answer pairs based on recursive operations.

21 Claims, 6 Drawing Sheets

IDENTIFYING REASONS FOR WEB SITE ABANDONMENT

BACKGROUND

Visitors to websites on the Internet come and go for a myriad of reasons. Unfortunately, these reasons are difficult for web site designers to discover, because visitors who leave (abandon the site) often have no incentive to explain why they are leaving.

Prior art teaches of some methods to discover these reasons, but each method has significant limitations. For example, websites can prompt users to answer questions about their experience before they leave; however, most visitors decline to respond, and if they do, they do so before they have decided to leave. The resulting data is therefore sparse and not conducive to generally explaining why most visitors leave. Websites can also use methods of tracking visitor activity, monitoring which website pages they view. This data can tell website owners form which pages visitors are most likely to leave, but not why the pages were left.

There exists a need for systems that track and transform activity by web site visitors and correlate the viewer activity to abandonment of the web site.

BRIEF SUMMARY

In some embodiments, a web page is configured to include at least one question and an associated answer to the question, and the web page is configured to generate a trackable action in response to presenting the answer to a visitor to the web page. The web page is operated over time while sequencing in a digital database first records associating (a) an identifier of the web page, and (b) an identifier of the visitor to the web page, and interleaving in the digital database sequencing of the first records with second records associating (c) the identifier of the visitor to the web page, and (d) an identifier of the associated answer to the question.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Glossary

"abandonment event" in this context refers to determination that a website visitor has abandoned the website after viewing an selected answer based on the elapsed time between viewing the answer and the their subsequent visit to another webpage.

"answer presentation entry" in this context refers to collection of the timestamp and unique question/answer ID generated by tracking logic and associated with an answer presentation event.

"answer presentation event" in this context refers to trackable interaction detected by the detection of an explicit user interaction to display at least one answer of a question and answer pair.

"associative destination accumulator logic" in this context refers to logic to identify webpages loaded successive to an answer presentation event based on the visitor id "counter" in this context refers to logic to perform statistical evaluations on a collection of stored elements.

"destination analysis logic" in this context refers to logic to identify the subsequent webpage viewed by a visitor following an answer presentation event.

"destination page" in this context refers to next webpage loaded by a visitor following the answer presentation event.

"record" in this context refers to a machine memory organization representing a data organization, where the data organization comprises multiple distinct datums related to one another through the data organization. A row of a machine memory database table is often referred to as a record.

"scoped domain" in this context refers to predefined collection of webpages and/or websites collectively as a web domain that include the at least one question and at least one associated answer or permit subsequent tracking interaction following an answer presentation event.

"tracking logic" in this context refers to logic that monitors actions from a scoped domain to generate unique visitor IDs, unique webpage ids, unique question/answer pair IDs, and timestamps to track user activity within the scoped domain.

"Web page" in this context refers to a file configured for access and display via a web browser over the Internet, or Internet-compatible networks. Also, logic defining an information container that is suitable for access and display using Internet standard protocols. Content defined in a web page is typically accessed using a web browser, and displayed. Web pages may provide navigation to other web pages or content via hypertext links. Web pages frequently subsume other resources such as style sheets, scripts and images into their final presentation. Web pages may be retrieved for display from a local storage device, or from a remote web server via a network connection.

DESCRIPTION

In some embodiments of a system and process for operating the system are described in which question and answer pairs are presented on pages of the website or other scoped domain (e.g., subdomain of web site, multiple web sites). The questions may be about anything related to the website and they may originate from any source. The answers may also originate from any source. In one embodiment, the questions are asked by previous visitors to the website and the answers are written by the web site owners, but questions written by the web site owners or answers written by the visitors are also suitable. The manner in which the questions and answers appear on the site is not critical to system operation.

The questions and answers are made available to visitors during web site browsing, and the web pages providing the questions and answers are configured such that viewing a question's answer requires an explicit trackable visitor action, such as a trappable action by a touch screen, pointer, or keyboard device. For example a trackable visitor action might be a click or a tap on a question to view it's answer. The more visible and accessible the questions, the more questions will be viewed, and the more tracking activity will be generated.

In one embodiment, each visitor is assigned a unique identifier, so that activity can be associated with that visitor. This may be accomplished for example using storage techniques often referred to as "cookies". Second, each unique page viewed by each user is detected and tracked, including a sequence order in which the page was viewed relative to other pages, a unique identifier for the page, and the unique identifier associated with the visitor viewing the page. In one embodiment, the sequence of page view is recorded with a timestamp, the page identifier is the website URL, and the visitor identifier is a session ID, generated when the visitor first visits the site. In addition to recording visitors and page views, each answer viewed by a visitor is recorded as part of the page view history, including a sequence in which the answer was viewed relative to page views and other answer views, and the visitor identifier associated with the person viewing the question. A result of this recorded activity is a sequential history of page view and answer view activity by each visitor on the website.

Thus in one embodiment a system presents frequently asked questions on a web site for visitors to access as they navigate the web site. Each time a visitor views a page on the web site, the page view is logged. Each time a visitor views the answer to one of the frequently asked questions, the answer view is also logged. The log of page views and the log of answer views is then analyzed to find the answers that are viewed on the final pages the visitor viewed. This list of answers viewed just prior to leaving provide web site owners a view into which concerns on the web site were most likely to cause a visitor to stop browsing the web site.

In some embodiments, the method of determining webpage abandonment configures webpages of a scoped domain to include at least one question and at least one associated answer displayable in response to receiving an explicit user interaction; implements tracking logic to: generate a unique visitor ID, a unique webpage ID, and a timestamp in response to detecting a webpage loading event on the scoped domain; generate a unique question/answer pair ID and an other timestamp in response to detecting an answer presentation event on the scoped domain; and operate a multiplexing switch to selectively transmit a webpage interaction entry and an answer presentation entry for storage in a scoped domain specific allocation of memory; identifies unique visitor IDs associated with answer presentation entries in the scoped domain specific allocation of memory through operation of respondent aggregator logic; configures destination analysis logic with identified unique visitor IDs to filter webpage interaction entries by the identified unique visitor IDs and identify the unique webpage ID of the webpage loaded successive to answer presentation events as a destination page based on the timestamps; configures an associative destination accumulator logic with destination pages and the unique visitor IDs to filters and enumerate the destination pages for each of the answer presentation entries as associated destination pages; configures a timer with a preset time interval stored in memory, to filter for the associated destination pages visited after the preset time interval elapses and identifying as an abandonment event based on the timestamps; operates a counter to enumerate the abandonment events to calculate a ranking metric to store question/answer pairs in ranked memory sectors of a question/answer abandonment ranking allocation of memory; and reposition store question/answer pairs in a correspondingly ranked memory sector in response to recursive operations of the counter through operations of a processor.

In some embodiments, the method of determining webpage abandonment configures each of the webpages of the scoped domain to include a classification ID corresponding to the content and/or function of the webpage.

In some embodiments, the method of determining webpage abandonment configures each of the question/answer pairs to include a classification tag corresponding to the content and/or function the question/answer pair is directed towards.

In some embodiments, the method of determining webpage abandonment configures the question/answer associator logic to operates with the associative destination accumulator logic to identify the classification ID and the classification tags of the destination pages and the answer presentation entries of the associated destination pages and modifies the ranking metric for the question/answer pairs with the classification tag matching the classification ID of the destination page.

In some embodiments, the explicit user interaction comprises scrolling/repositioning the webpage to bring the at least one associated answer into view of a user viewable area.

In some embodiments, the preset time intervals to determine website abandonment differs between the destination pages based, at least in part, on a classification ID of the webpages, a classification tag of the question/answer pairs, and time/date of the webpage loading event.

In some embodiments, the scoped domain comprises a subdomain of the website.

In some embodiments, the scoped domain comprises a plurality of website as part of a network of websites.

In some embodiments, a QA abandonment report is generated, at least in part, from the positioning of the question/answer pairs in the ranked memory sector.

In some embodiments, a goal page and a failure page may be implemented as a tracking metrics for individual webpages on the scoped domain. The goal pages represent an intended destination page following viewership of a question/answer pair. For example if a visitor views a question/answer pair relating to a feature or event in the profile page, the particular profile page may be considered the goal page for the particular question and answer pair. Conversely a failure page may represent a webpage on the scoped domain that may be viewed by the visitor following a particular question/answer pair but is not the webpage intended by a web designer.

In some embodiments the interval of time used to make determination whether the elapsed time between an answer presentation event and the next webpage loading event on the scoped domain is considered abandonment event may be dynamically modified based, at least in part, on the specifics of a question/answer pair, the specific web page viewed as destination page, the time or date that the event occurred, as well as heuristic data collected for a particular visitor ID.

In operation this machine system may operate to produce a memory organization in the digital database representing sequenced identified user interaction with identified web pages further sequenced with identified answers to questions by the identified users of the identified web pages.

The system comprises respondent aggregator, destination analyzer, answer-question associator, associative destination accumulator, timer, statistical ranker, counter, and memory.

In some embodiments, the respondent aggregator processes a machine memory organization representing tracked user activity on a web page to identify all visitors (visitor ids) who have viewed the answer to at least one question presented in conjunction with a web page. The destination analyzer processes the machine memory organization representing tracked user activity and for each answer viewed, determines a page that the visitor viewed after viewing the answer (destination pages).

The associative destination accumulator receives the visitor ids from the respondent aggregator, and the destination pages from the destination analyzer, and in response determines a page visit for each visitor following an answer exposure. These are web page destinations associated with particular answers, herein associated destinations. The associative destination accumulator may cooperate with an answer-question associator to correlate questions with associated destinations.

The timer receives the associated destinations from the associative destination accumulator and in response applies time intervals from the associated destinations to distinguish abandonment activity. The time intervals may be determined as a time between a particular visitor's exposure to a question and a time of a visit to a next web page. The timer may thus identify pages that are "abandoned" because a visitor did not visit a web page in the scoped domain of tracking (e.g., a web domain) within a pre-configured time interval, where the time interval is configurable individually across domains or other tracking scopes (e.g., subdomains or multiple domains). Destinations are thus "timed" by the timer to form timed destinations.

The counter receives the timed destinations from the timer and in response tally's abandonment activity and non abandonment activity for each tracked web page. The counter forms associated counts for each web page, indicating how many times each answer exposure (and by association, each question) led to a particular page view, or led to abandonment. The statistical ranker receives the associated counts from the counter and in response ranks questions by percent views that lead to abandonment activity.

Whether a page was "viewed" after viewing an answer is configurable explicitly and/or self-configuring based on patterns of visitor activity on the web site. For example, on an e-commerce website, the abandonment time might be hour, as a visitor who returns after an hour might be making a new purchase. On a website that is only used infrequently by visitors (the U.S. patent office website, for example), the abandonment time might be month) or longer.

In one embodiment, a ranked list of questions produced by the statistical ranker is presented to the web site owners as a list of questions on a machine display device (e.g., a "screen" or "monitor"). Each question may be presented as a possible reason for abandonment, providing insight to web site owners about which questions contributed most to abandonment. For each question, an embodiment of the ranked list organizes a percentage of answer views that led to abandonment as well as a percentage of answer views that led to activity (e.g., views) on other pages of the web site (or other scoped domain for tracking).

In some embodiments the method may implement configuring a web page to include at least one question and an associated answer to the question, the web page configured to generate a trackable action in response to presenting the answer to a visitor to the web page.

In some embodiments the method may implement operating the web page over time while sequencing in a digital database first records associating (a) an identifier of the web page, and (b) an identifier of the visitor to the web page.

In some embodiments the method may implement interleaving in the digital database sequencing of the first records with second records associating (c) the identifier of the visitor to the web page, and (d) an identifier of the associated answer to the question.

In some embodiments the method may implement configuring a web page to include at least one question and an associated answer to the question, the web page configured to generate a trackable action in response to presenting the answer to a visitor to the web page; operating the web page over time while sequencing in a digital database first records associating (a) an identifier of the web page, and (b) an identifier of the visitor to the web page; and interleaving in the digital database sequencing of the first records with second records associating (c) the identifier of the visitor to the web page, and (d) an identifier of the associated answer to the question.

DRAWINGS

Figure 1:
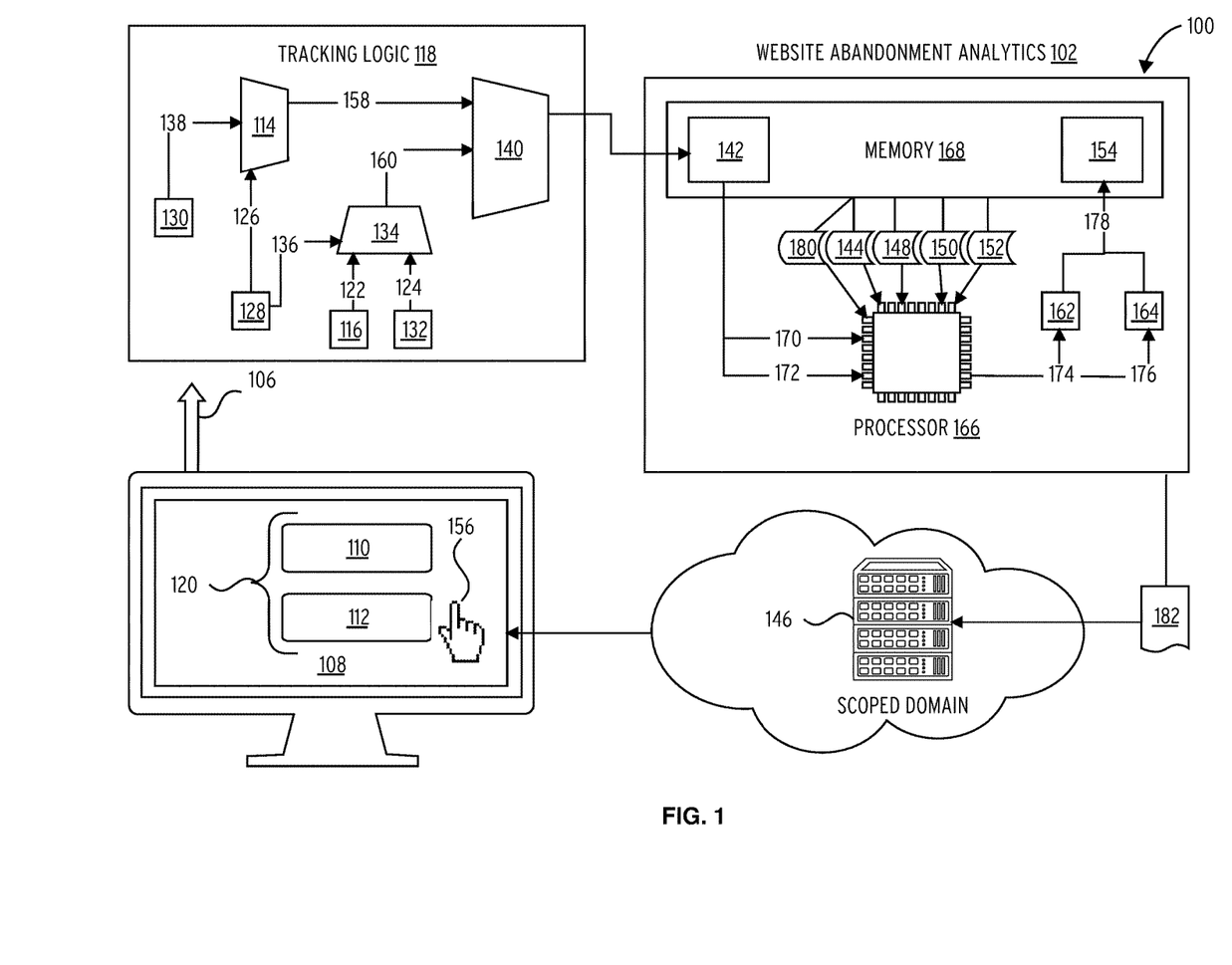
FIG. 1 illustrates an embodiment of a website abandonment tracking system 100

FIG. 1 illustrates an embodiment of the website abandonment tracking system 100. The website abandonment tracking system 100 comprises a scoped domain 146, a webpage 108, a monitoring signal 106, a tracking logic 118, and a website abandonment Analytics 102. The scoped domain 146 comprises the webpage 108. The webpage 108 comprises a unique question/answer pair ID 120 and an explicit user interaction 156. The unique question/answer pair ID 120 comprises a question 110 and an Associated answer 112. The tracking logic 118 comprises a unique question/answer pair ID generator 130, a digital clock 128, a unique visitor ID generator 116, a unique webpage ID generator 132, unique question/answer pair ID 138, a timestamp 126, a timestamp 136, a unique visitor ID 122, a unique webpage ID 124, a first associative combiner logic 114, a second associative combiner logic 134, a webpage interaction signal 158, an answer presentation signal 160, and a multiplexing switch 140. The website abandonment Analytics 102 comprises a memory 168, a processor 166, a counter 162, and a timer 164. The memory 168 comprises a scoped domain specific allocation of memory 142, a ranked memory sector 154, a respondent aggregator logic 144, a question/answer associator logic 180, a destination analysis logic 148, an associative destination accumulator logic 150, and an associative destination accumulator logic 152. The scoped domain specific allocation of memory 142 comprises unique visitor IDs 170 and destination pages 172. The ranked memory sector 154 comprises associated destination pages 174 and abandonment events 176, as ranked question/answer pairs 178. The website abandonment Analytics 102 makes a QA abandonment report 182 generated at least in part from the ranked memory sector 154, available to admins of the scoped domain 146.

Figure 2:
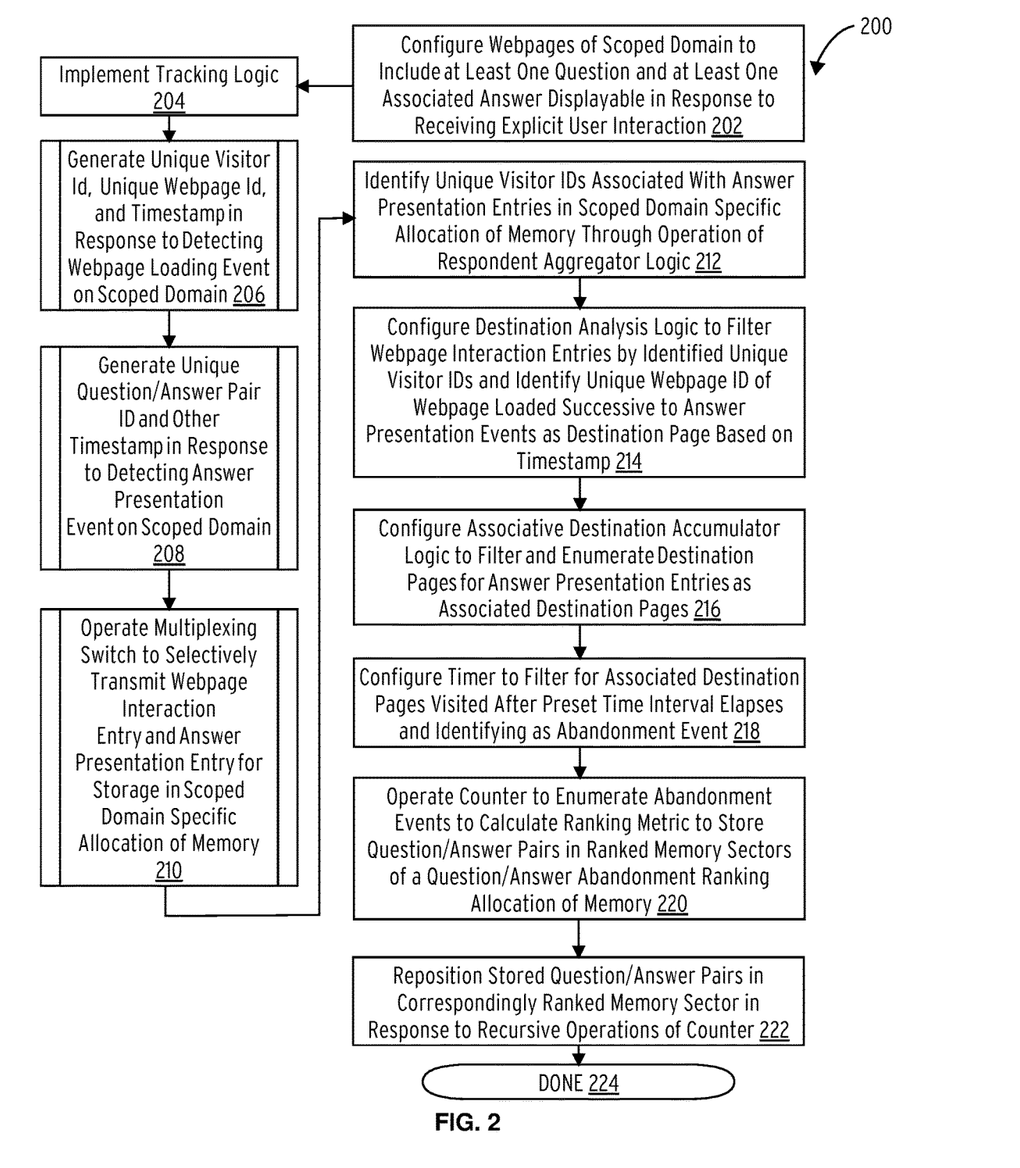
FIG. 2 illustrates an embodiment of a method of tracking website abandonment 200.
Figure 3:
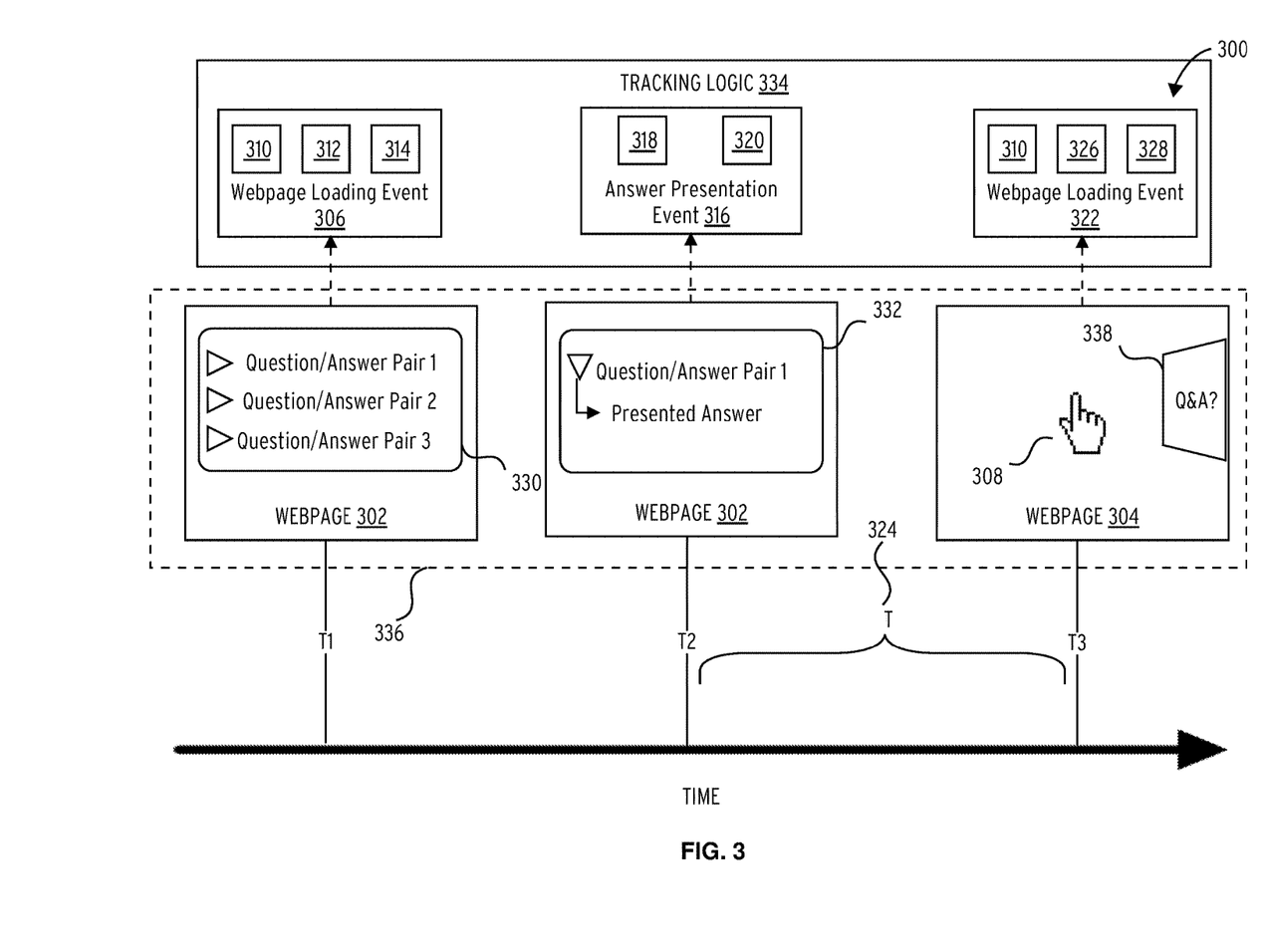
FIG. 3 illustrates an embodiment of a monitoring signal tracking process 300.
Figure 4:
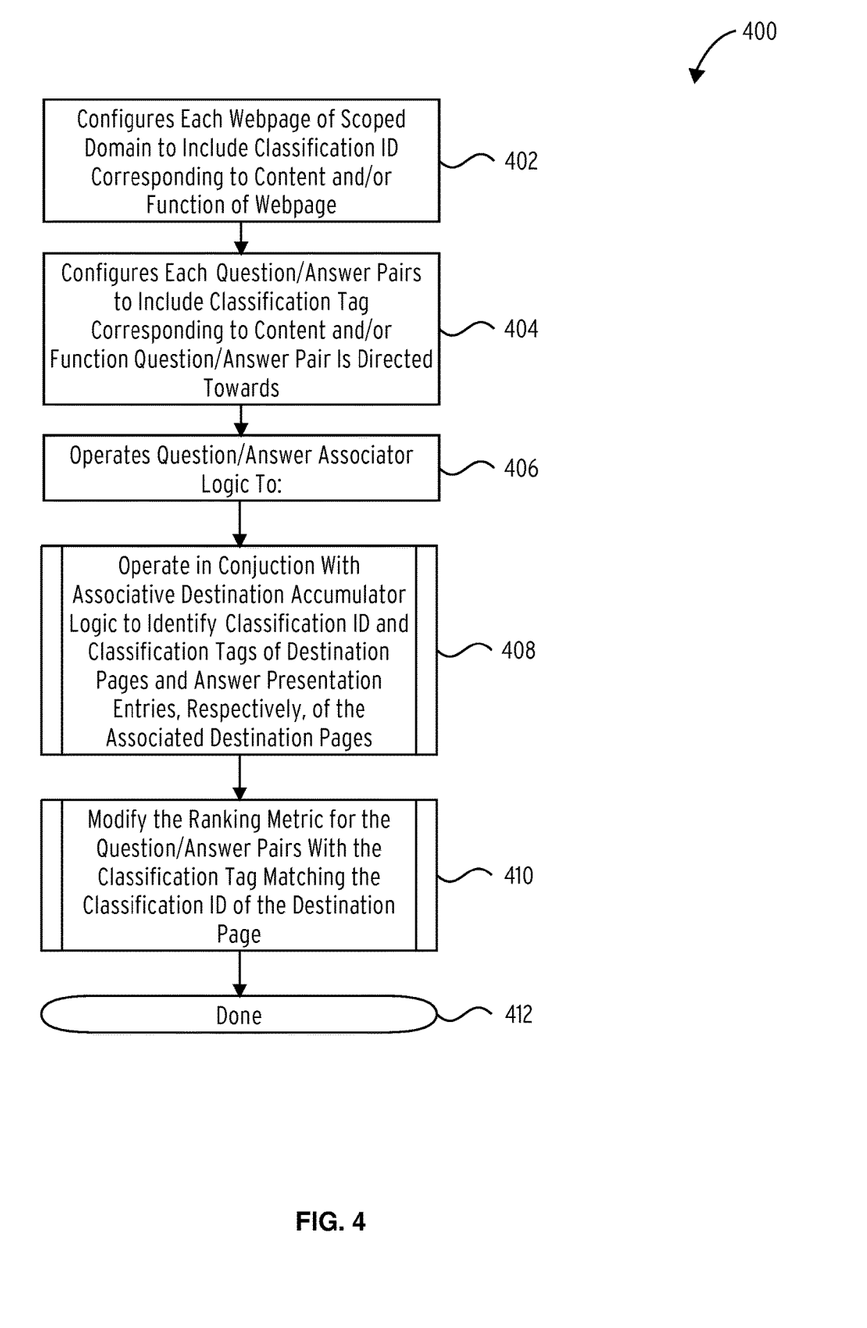
FIG. 4 illustrates an embodiment of a method of adjusting question/answer pair ranking 400.

The website abandonment tracking system 100 may be operated in accordance with the processes described in FIG. 2, FIG. 3, and FIG. 4.

FIG. 2 illustrates an embodiment of the method of tracking website abandonment 200.

In block 202, method of tracking website abandonment 200 configures webpages of a scoped domain to include at least one question and at least one associated answer displayable in response to receiving an explicit user interaction, wherein the at least one of question and the at least one at least one associated answer comprise a question/answer pair.

In block 204, method of tracking website abandonment 200 implements tracking logic.

In subroutine block 206, method of tracking website abandonment 200 generates a unique visitor ID, a unique webpage ID, and a timestamp in response to detecting a webpage loading event on the scoped domain.

In subroutine block 208, method of tracking website abandonment 200 generates a unique question/answer pair ID and an other timestamp in response to detecting an answer presentation event on the scoped domain.

In subroutine block 210, method of tracking website abandonment 200 operates a multiplexing switch to selectively transmit a webpage interaction entry and an answer presentation entry for storage in a scoped domain specific allocation of memory. In block 212, method of tracking website abandonment 200 identifies unique visitor IDs associated with answer presentation entries in the scoped domain specific allocation of memory through operation of respondent aggregator logic. In block 214, method of tracking website abandonment 200 configures destination analysis logic with identified unique visitor IDs to filter webpage interaction entries by the identified unique visitor IDs and identify the unique webpage ID of the webpage loaded successive to answer presentation events as a destination page based on the timestamps. In block 216, method of tracking website abandonment 200 configures an associative destination accumulator logic with destination pages and the unique visitor IDs to filters and enumerate the destination pages for each of the answer presentation entries as associated destination pages. In block 218, method of tracking website abandonment 200 configures a timer with a preset time interval stored in memory, to filter for the associated destination pages visited after the preset time interval elapses and identifying as an abandonment event based on the timestamps. In block 220, method of tracking website abandonment 200 operates a counter to enumerate the abandonment events to calculate a ranking metric to store question/answer pairs in ranked memory sectors of a question/answer abandonment ranking allocation of memory. In block 222, method of tracking website abandonment 200 repositions stored question/answer pairs in a correspondingly ranked memory sector in response to recursive operations of the counter through operations of a processor. In done block 224, method of tracking website abandonment 200 ends.

FIG. 3 illustrates an embodiment of the monitoring signal tracking process 300.

The monitoring signal tracking process 300 comprises time points T1, T2, and T3 representing the occurrences of trackable events in a monitoring signal 336 detected tracking logic 334. T1 corresponds to a webpage loading event 306 for a webpage 302. The webpage 302 comprises at least one question and at least one associated answer 330. At T1 the tracking logic 334 identifies the webpage loading event 306 and generates a unique visitor ID 310, a timestamp 312, and a unique webpage ID 314. T2 corresponds to an answer presentation event 316 for the webpage 302. The webpage 302 received an explicit user interaction resulting in the displayed associated answer 332. At T2 the tracking logic 334 identifies the answer presentation event 316 and generates a unique question/answer pair ID 318 and a timestamp 320. T3 corresponds to a webpage loading event 322 for a webpage 304. The webpage 304 comprises Q&A; element 338 and a webpage interaction entry 308. At T3 the tracking logic 334 identifies the webpage loading event 322 and generates a unique visitor ID 310, a timestamp 326, and a unique webpage ID 328. An Interaction interval 324 is the elapsed time between T2 and T3 used to determine website abandonment.

The monitoring signal tracking process 300 may be operated in accordance to the descriptions in FIG. 2.

FIG. 4 illustrates an embodiment of the method of adjusting question/answer pair ranking 400.

In block 402, method of adjusting question/answer pair ranking 400 configures each of the webpages of the scoped domain to include a classification ID corresponding to the content and/or function of the webpage. In block 404, method of adjusting question/answer pair ranking 400 configures each of the question/answer pairs to include a classification tag corresponding to the content and/or function the question/answer pair is directed toward. In block 406, method of adjusting question/answer pair ranking 400 operates question/answer associator logic. In subroutine block 408, method of adjusting question/answer pair ranking 400 implements question/answer associator logic to operates with the associative destination accumulator logic to identify the classification ID and the classification tags of the destination pages and the answer presentation entries of the associated destination pages. In subroutine block 410, method of adjusting question/answer pair ranking 400 implements question/answer associator logic to modify the ranking metric for the question/answer pairs with the classification tag matching the classification ID of the destination page.

Figure 5:
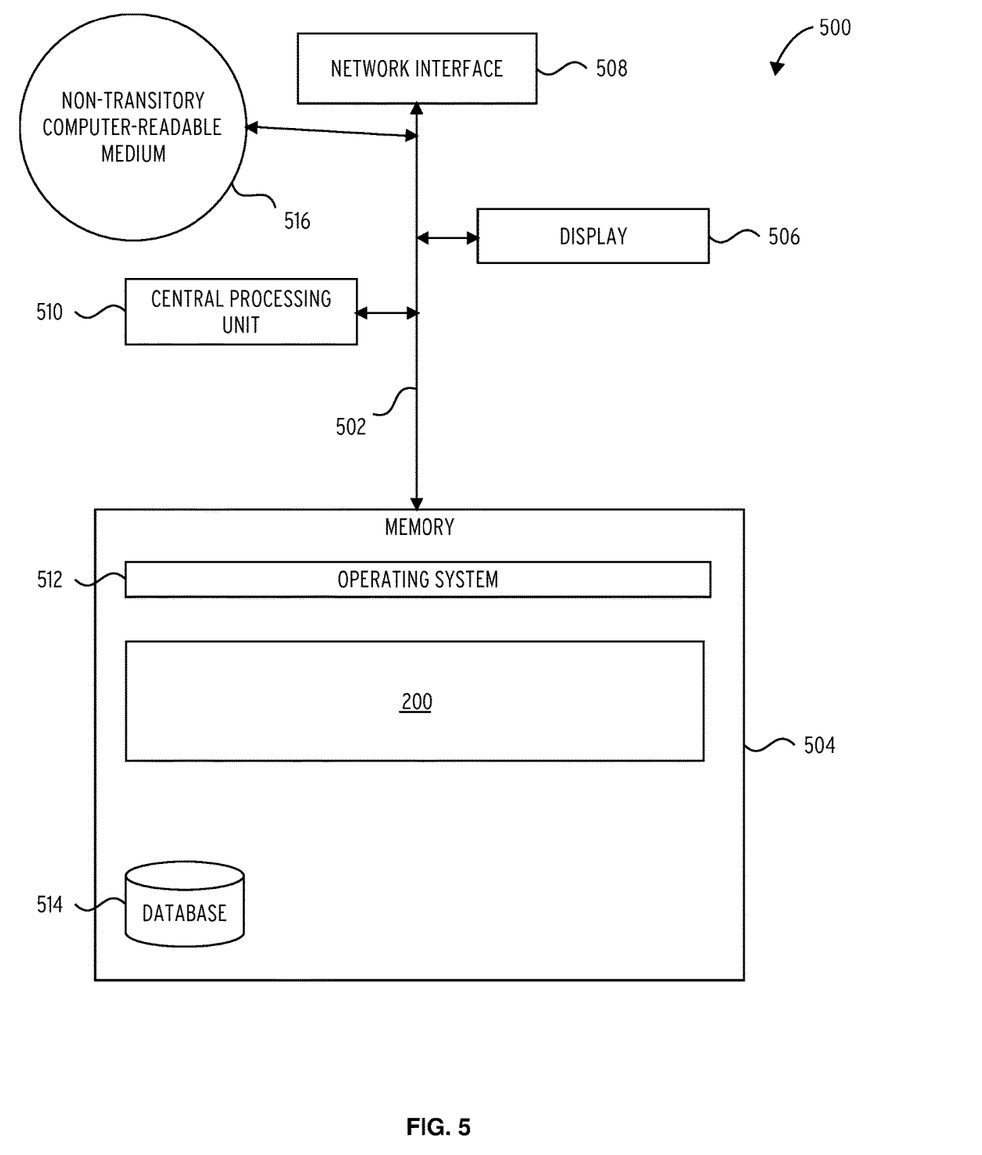
FIG. 5 illustrates a server 400 in accordance with one embodiment.

FIG. 5 illustrates several components of an exemplary server 500 in accordance with one embodiment. In various embodiments, server 500 may include a desktop PC, server, workstation, mobile phone, laptop, tablet, set-top box, appliance, or other computing device that is capable of performing operations such as those described herein. In some embodiments, server 500 may include many more components than those shown in FIG. 5. However, it is not necessary that all of these generally conventional components be shown in order to disclose an illustrative embodiment. Collectively, the various tangible components or a subset of the tangible components may be referred to herein as "logic" configured or adapted in a particular way, for example as logic configured or adapted with particular software or firmware.

In various embodiments, server 500 may comprise one or more physical and/or logical devices that collectively provide the functionalities described herein. In some embodiments, server 500 may comprise one or more replicated and/or distributed physical or logical devices.

In some embodiments, server 500 may comprise one or more computing resources provisioned from a "cloud computing" provider, for example, Amazon Elastic Compute Cloud ("Amazon EC2"), provided by Amazon.com, Inc. of Seattle, Wash.; Sun Cloud Compute Utility, provided by Sun Microsystems, Inc. of Santa Clara, Calif.; Windows Azure, provided by Microsoft Corporation of Redmond, Wash., and the like.

Server 500 includes a bus 502 interconnecting several components including a network interface 508, a display 506, a central processing unit 510, and a memory 504.

Memory 504 generally comprises a random access memory ("RAM") and permanent non-transitory mass storage device, such as a hard disk drive or solid-state drive. Memory 504 stores an operating system 512.

These and other software components may be loaded into memory 504 of server 500 using a drive mechanism (not shown) associated with a non-transitory computer-readable medium 516, such as a floppy disc, tape, DVD/CD-ROM drive, memory card, or the like.

Memory 504 also includes database 514. In some embodiments, server 500 may communicate with database 514 via network interface 508, a storage area network ("SAN"), a high-speed serial bus, and/or via the other suitable communication technology.

In some embodiments, database 514 may comprise one or more storage resources provisioned from a "cloud storage" provider, for example, Amazon Simple Storage Service ("Amazon S3"), provided by Amazon.com, Inc. of Seattle, Wash., Google Cloud Storage, provided by Google, Inc. of Mountain View, Calif., and the like.

References to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. "Logic" refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter). Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein. The techniques and procedures described herein may be implemented via logic distributed in one or more computing devices. The particular distribution and choice of logic will vary according to implementation. Those having skill in the art will appreciate that there are various logic implementations by which processes and/or systems described herein can be effected (e.g., hardware, software, and/or firmware), and that the preferred vehicle will vary with the context in which the processes are deployed. "Software" refers to logic that may be readily readapted to different purposes (e.g. read/write volatile or nonvolatile memory or media). "Firmware" refers to logic embodied as read-only memories and/or media. Hardware refers to logic embodied as analog and/or digital circuits. If an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware. The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, flash drives, SD cards, solid state fixed or removable storage, and computer memory. In a general sense, those skilled in the art will recognize that the various aspects described herein which can be implemented, individually and/or collectively, by a wide range of hardware, software, firmware, or any combination thereof can be viewed as being composed of various types of "circuitry." Consequently, as used herein "circuitry" includes, but is not limited to, electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), circuitry forming a memory device (e.g., forms of random access memory), and/or circuitry forming a communications device (e.g., a modem, communications switch, or optical-electrical equipment). Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

Figure 6:
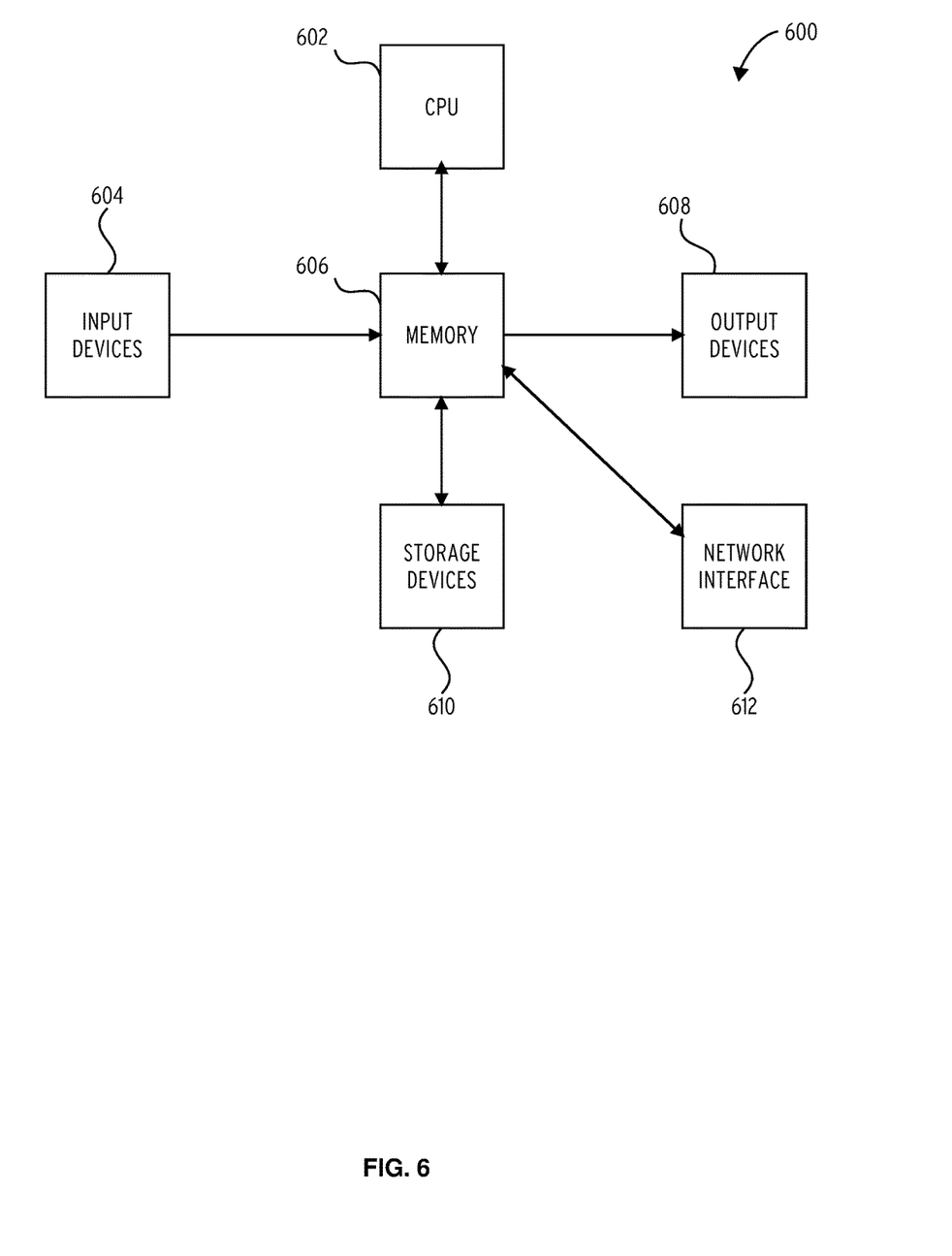
FIG. 6 illustrates an embodiment of a digital apparatus 600 to implement components and process steps of the system described herein.

FIG. 6 illustrates an embodiment of a digital apparatus 600 to implement components and process steps of the system described herein.

Input devices 604 comprise transducers that convert physical phenomenon into machine internal signals, typically electrical, optical or magnetic signals. Signals may also be wireless in the form of electromagnetic radiation in the radio frequency (RF) range but also potentially in the infrared or optical range. Examples of input devices 604 are keyboards which respond to touch or physical pressure from an object or proximity of an object to a surface, mice which respond to motion through space or across a plane, microphones which convert vibrations in the medium (typically air) into device signals, scanners which convert optical patterns on two or three dimensional objects into device signals. The signals from the input devices 604 are provided via various machine signal conductors (e.g., busses or network interfaces) and circuits to memory 606.

The memory 606 is typically what is known as a first or second level memory device, providing for storage (via configuration of matter or states of matter) of signals received from the input devices 604, instructions and information for controlling operation of the CPU 602, and signals from storage devices 610.

Information stored in the memory 606 is typically directly accessible to the CPU 602 of the device. Signals input to the device cause the reconfiguration of the internal material/energy state of the memory 606, creating in essence a new machine configuration, influencing the behavior of the digital apparatus 600 by affecting the behavior of the CPU 602 with control signals (instructions) and data provided in conjunction with the control signals.

Second or third level storage devices 610 may provide a slower but higher capacity machine memory capability. Examples of storage devices 610 are hard disks, optical disks, large capacity flash memories or other non-volatile memory technologies, and magnetic memories.

The CPU 602 may cause the configuration of the memory 606 to be altered by signals in storage devices 610. In other words, the CPU 602 may cause data and instructions to be read from storage devices 610 in the memory 606 from which may then influence the operations of CPU 602 as instructions and data signals, and from which it may also be provided to the output devices 608. The CPU 602 may alter the content of the memory 606 by signaling to a machine interface of memory 606 to alter the internal configuration, and then converted signals to the storage devices 610 to alter its material internal configuration. In other words, data and instructions may be backed up from memory 606, which is often volatile, to storage devices 610, which are often non-volatile.

Output devices 608 are transducers which convert signals received from the memory 606 into physical phenomenon such as vibrations in the air, or patterns of light on a machine display, or vibrations (i.e., haptic devices) or patterns of ink or other materials (i.e., printers and 3-D printers).

The network interface 612 receives signals from the memory 606 and converts them into electrical, optical, or wireless signals to other machines, typically via a machine network. The network interface 612 also receives signals from the machine network and converts them into electrical, optical, or wireless signals to the memory 606.

References to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. "Logic" refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter). Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein. The techniques and procedures described herein may be implemented via logic distributed in one or more computing devices. The particular distribution and choice of logic will vary according to implementation. Those having skill in the art will appreciate that there are various logic implementations by which processes and/or systems described herein can be effected (e.g., hardware, software, and/or firmware), and that the preferred vehicle will vary with the context in which the processes are deployed. "Software" refers to logic that may be readily readapted to different purposes (e.g. read/write volatile or nonvolatile memory or media). "Firmware" refers to logic embodied as read-only memories and/or media. Hardware refers to logic embodied as analog and/or digital circuits. If an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware. The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, flash drives, SD cards, solid state fixed or removable storage, and computer memory. In a general sense, those skilled in the art will recognize that the various aspects described herein which can be implemented, individually and/or collectively, by a wide range of hardware, software, firmware, or any combination thereof can be viewed as being composed of various types of "circuitry." Consequently, as used herein "circuitry" includes, but is not limited to, electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), circuitry forming a memory device (e.g., forms of random access memory), and/or circuitry forming a communications device (e.g., a modem, communications switch, or optical-electrical equipment). Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

What is claimed is:

1. A method of determining webpage abandonment comprises:
    configuring webpages of a scoped domain to include at least one question and at least one associated answer displayable in response to receiving an explicit user interaction, wherein the at least one question and the at least one associated answer comprise a question/answer (QA) pair;
    implementing tracking logic to:
        generating a unique visitor Identifier (ID), a unique webpage ID, and a first timestamp in response to detecting a webpage loading event on the scoped domain;
        generating a unique question/answer pair ID and an other timestamp in response to detecting an answer presentation event on the scoped domain; and
        operating a multiplexing switch to selectively transmit a webpage interaction entry and an answer presentation entry for storage in a scoped domain specific allocation of memory;
    identifying unique visitor IDs associated with answer presentation entries in the scoped domain specific allocation of memory through operation of respondent aggregator logic; configuring destination analysis logic with identified unique visitor IDs to filter webpage interaction entries by the identified unique visitor IDs and identify the unique webpage ID of the webpage loaded successive to answer presentation events as a destination page based on the other timestamps;
    configuring an associative destination accumulator logic with destination pages and the unique visitor IDs to filters and enumerate the destination pages for each of the answer presentation entries as associated destination pages;
    configuring a timer with a preset time interval stored in memory, to filter for the associated destination pages visited after the preset time interval elapses and identifying as an abandonment event based on the timestamps;
    operating a counter to enumerate the abandonment events to calculate a ranking metric to store question/answer pairs in ranked memory sectors of a question/answer abandonment ranking allocation of memory; and
    repositioning stored question/answer pairs in a correspondingly ranked memory sector in response to recursive operations of the counter through operations of a processor.

2. The method of claim 1 comprises:
    configuring each of the webpages of the scoped domain to include a classification ID corresponding to the content and/or function of the webpage;
    configuring each of the question/answer pairs to include a classification tag corresponding to the content and/or function the question/answer pair is directed towards; and
    operating question/answer associator logic to:
    operate with the associative destination accumulator logic to identify the classification ID and the classification tags of the destination pages and the answer presentation entries, respectively, of the associated destination pages; and
    modify the ranking metric for the question/answer pairs with the classification tag matching the classification ID of the destination page.

3. The method of claim 1, wherein the explicit user interaction comprises scrolling/repositioning the webpage to bring the at least one associated answer into view of a user viewable area.

4. The method of claim 1, wherein the preset time intervals to determine website abandonment differs between the destination pages based, at least in part, on a classification ID of the webpages, a classification tag of the question/answer pairs, and time/date of the webpage loading event.

5. The method of claim 1, wherein the scoped domain comprises a subdomain of the website.

6. The method of claim 1, wherein the scoped domain comprises a plurality of website as part of a network of websites.

7. The method of claim 1, wherein a QA abandonment report is generated, at least in part, from the positioning of the question/answer pairs in the ranked memory sector.

8. A non-transitory computer-readable storage medium, the computer-readable storage medium including instructions that when executed by a computer, cause the computer to:
configure webpages of a scoped domain to include at least one question and at least one associated answer displayable in response to receiving an explicit user interaction, wherein the at least one of question and the at least one at least one associated answer comprise a question/answer (QA) pair;
implement tracking logic to:
generate a unique visitor Identifier (ID), a unique webpage ID, and a first timestamp in response to detecting a webpage loading event on the scoped domain;
generate a unique question/answer pair ID and an other timestamp in response to detecting an answer presentation event on the scoped domain;
operate a multiplexing switch to selectively transmit a webpage interaction entry and an answer presentation entry for storage in a scoped domain specific allocation of memory; identify unique visitor IDs associated with answer presentation entries in the scoped domain specific allocation of memory through operation of respondent aggregator logic;
configure destination analysis logic with identified unique visitor IDs to filter webpage interaction entries by the identified unique visitor IDs and identify the unique webpage ID of the webpage loaded successive to answer presentation events as a destination page based on the other timestamps;
configure an associative destination accumulator logic with destination pages and the unique visitor IDs to filters and enumerate the destination pages for each of the answer presentation entries as associated destination pages;
configure a timer with a preset time interval stored in memory, to filter for the associated destination pages visited after the preset time interval elapses and identifying as an abandonment event based on the timestamps;
operate a counter to enumerate the abandonment events to calculate a ranking metric to store question/answer pairs in ranked memory sectors of a question/answer abandonment ranking allocation of memory; and
reposition store question/answer pairs in a correspondingly ranked memory sector in response to recursive operations of the counter through operations of a processor.

9. The computer-readable storage medium of claim 8 comprises:
configure each of the webpages of the scoped domain to include a classification ID corresponding to the content and/or function of the webpage;
configure each of the question/answer pairs to include a classification tag corresponding to the content and/or function the question/answer pair is directed towards; and
operate question/answer associator logic to:
operate with the associative destination accumulator logic to identify the classification ID and the classification tags of the destination pages and the answer presentation entries, respectively, of the associated destination pages; and
modify the ranking metric for the question/answer pairs with the classification tag matching the classification ID of the destination page.

10. The computer-readable storage medium of claim 8, wherein the explicit user interaction comprises scrolling/repositioning the webpage to bring the at least one associated answer into view of a user viewable area.

11. The computer-readable storage medium of claim 8, wherein the preset time intervals to determine website abandonment differs between the destination pages based, at least in part, on a classification ID of the webpages, a classification tag of the question/answer pairs, and time/date of the webpage loading event.

12. The computer-readable storage medium of claim 8, wherein the scoped domain comprises a subdomain of the website.

13. The computer-readable storage medium of claim 8, wherein the scoped domain comprises a plurality of website as part of a network of websites.

14. The computer-readable storage medium of claim 8, wherein a QA abandonment report is generated, at least in part, from the positioning of the question/answer pairs in the ranked memory sector.

15. A computer system, comprises: a
processor; and
a memory storing instructions that, when executed by the processor, configure the apparatus to:
configure webpages of a scoped domain to include at least one question and at least one associated answer displayable in response to receiving an explicit user interaction, wherein the at least one of question and the at least one at least one associated answer comprise a question/answer (QA) pair;
implement tracking logic to:
generate a unique visitor Identifier (ID), a unique webpage ID, and a first timestamp in response to detecting a webpage loading event on the scoped domain;
generate a unique question/answer pair ID and an other timestamp in response to detecting an answer presentation event on the scoped domain; and
operate a multiplexing switch to selectively transmit a webpage interaction entry and an answer presentation entry for storage in a scoped domain specific allocation of memory;
identify unique visitor IDs associated with answer presentation entries in the scoped domain specific allocation of memory through operation of respondent aggregator logic;
configure destination analysis logic with identified unique visitor IDs to filter webpage interaction entries by the identified unique visitor IDs and identify the unique webpage ID of the webpage loaded successive to answer presentation events as a destination page based on the other timestamps;

configure an associative destination accumulator logic with destination pages and the unique visitor IDs to filters and enumerate the destination pages for each of the answer presentation entries as associated destination pages;

configure a timer with a preset time interval stored in memory, to filter for the associated destination pages visited after the preset time interval elapses and identifying as an abandonment event based on the timestamps;

operate a counter to enumerate the abandonment events to calculate a ranking metric store question/answer pairs in ranked memory sectors of a question/answer abandonment ranking allocation of memory; and reposition displayed question answer pairs in a correspondingly ranked memory sector in response to recursive operations of the counter through operations of a processor.

16. The computer system as claimed in claim 15 comprises:

configure each of the webpages of the scoped domain to include a classification ID corresponding to the content and/or function of the webpage;

configure each of the question/answer pairs to include a classification tag corresponding to the content and/or function the question/answer pair is directed towards; and operate question/answer associator logic to:

operate with the associative destination accumulator logic to identify the classification ID and the classification tags of the destination pages and the answer presentation entries, respectively, of the associated destination pages; and modify the ranking metric for the question/answer pairs with the classification tag matching the classification ID of the destination page.

17. The computer system as claimed in claim 15, wherein the explicit user interaction comprises scrolling/repositioning the webpage to bring the at least one associated answer into view of a user viewable area.

18. The computer system as claimed in claim 15, wherein the preset time intervals to determine website abandonment differs between the destination pages based, at least in part, on a classification ID of the webpages, a classification tag of the question/answer pairs, and time/date of the webpage loading event.

19. The computer system as claimed in claim 15, wherein the scoped domain comprises a subdomain of the website.

20. The computer system as claimed in claim 15, wherein the scoped domain comprises a plurality of website as part of a network of websites.

21. The computer system as claimed in claim 15, a QA abandonment report is generated, at least in part, from the positioning of the question/answer pairs in the ranked memory sector.

* * * * *